(12) United States Patent
Mori

(10) Patent No.: US 8,608,233 B2
(45) Date of Patent: Dec. 17, 2013

(54) FRAMEWORK STRUCTURE OF VEHICLE

(75) Inventor: Takeo Mori, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 17 days.

(21) Appl. No.: 13/126,558

(22) PCT Filed: Jan. 8, 2009

(86) PCT No.: PCT/JP2009/050139
§ 371 (c)(1),
(2), (4) Date: Apr. 28, 2011

(87) PCT Pub. No.: WO2010/079601
PCT Pub. Date: Jul. 15, 2010

(65) Prior Publication Data
US 2011/0241384 A1 Oct. 6, 2011

(51) Int. Cl.
B62D 25/04 (2006.01)
(52) U.S. Cl.
USPC ............. 296/187.12; 296/193.06; 296/203.03
(58) Field of Classification Search
USPC .............. 296/187.12, 193.05, 193.06, 203.03
See application file for complete search history.

(56) References Cited

U.S. PATENT DOCUMENTS

| 7,510,234 B2 * | 3/2009 | Ameloot et al. | 296/187.12 |
| 2009/0085379 A1 * | 4/2009 | Takahashi et al. | 296/193.06 |
| 2011/0101734 A1 * | 5/2011 | Gunther et al. | 296/193.06 |
| 2011/0127802 A1 * | 6/2011 | Kim et al. | 296/203.03 |
| 2011/0233970 A1 * | 9/2011 | Nagai et al. | 296/203.03 |

FOREIGN PATENT DOCUMENTS

| EP | 1 074 457 A2 | 2/2001 |
| EP | 1 234 750 A1 | 8/2002 |
| EP | 1 247 725 A1 | 10/2002 |
| EP | 1 375 682 A1 | 1/2004 |
| JP | 11-192970 A | 7/1999 |
| JP | 2002-053068 A | 2/2002 |
| JP | 2003-127901 A | 5/2003 |

OTHER PUBLICATIONS

International Preliminary Report on Patentability Issued Aug. 16, 2011.
International Search Report dated Apr. 7, 2009.
Supplementary European Search Report issued May 14, 2012 in EP Application No. 09 83 7489.

* cited by examiner

Primary Examiner — Jason S Morrow
(74) Attorney, Agent, or Firm — Kenyon & Kenyon LLP

(57) ABSTRACT

There is provided a framework structure of a vehicle where high productivity can be obtained, a reinforcement and an outer frame can be completely welded to each other, and the reinforcing ability of the reinforcing member can be sufficiently obtained when the reinforcing member is provided on the outer member. A plurality of protruding portions, which protrudes toward an outer member, is formed on the outer surface of a reinforcement of a center pillar. These protruding portions are disposed so as to be separated from each other in the longitudinal direction of the reinforcement. Further, non-protruding portions where the protruding portions are not formed are formed in the vicinity of a belt line, and the protruding portions are formed at other positions.

2 Claims, 8 Drawing Sheets

FRAMEWORK STRUCTURE OF VEHICLE

This is a 371 national phase application of PCT/JP2009/050139 filed 8 Jan. 2009, the contents of which are incorporated herein by reference.

TECHNICAL FIELD

The present invention relates to a framework structure of a vehicle, and more particularly, to a framework structure of a vehicle where a reinforcing member is provided inside a framework member of a vehicle.

BACKGROUND ART

As a framework structure of a vehicle, there is, for example, a framework structure where a reinforcing member is provided between an outer frame and an inner frame in a framework member used for a center pillar. The outer frame of the center pillar includes a long portion that has a substantially U-shaped cross-section and extends in a vertical direction. As the reinforcing member that is provided inside the long portion, a reinforcing member, which has a substantially U-shaped cross-section and extends in a vertical direction, is used.

As this kind of framework structure, in the past, there has been a center pillar structure including a reinforcement. The reinforcement is formed so that a protruding portion, which is formed so as to have a substantially chevron shape toward the outside of a vehicle body, keeps substantially uniform cross-sectional width along the vertical direction (for example, see Patent Literature 1). In this center pillar structure, the protruding portion is formed on the reinforcement so as to have a substantially chevron shape toward the outside of the vehicle body. Accordingly, the vehicle body is stably deformed by an impact, which is applied from the side of the vehicle body, and can absorb the impact.

In the center pillar structure disclosed in Patent Literature 1, the protruding portion of the reinforcement is formed so as to keep substantially uniform width along the vertical direction. Here, since the reinforcement is disposed along the outer frame and the outer frame and the reinforcement are welded to each other, the reinforcement needs to be formed so that the outer shape of the reinforcement corresponds to the inner shape of the outer frame. However, since the reinforcement and the outer frame have a curved shape, it is difficult to form the reinforcement so that the outer shape of the reinforcement corresponds to the inner shape of the outer frame. If the outer shape of the reinforcement does not correspond to the inner shape of the outer frame, there is a possibility that the welding between the outer frame and the reinforcement will be incomplete.

Meanwhile, there is a reinforcement that is shown in FIG. 8 and used for a center pillar. This center pillar includes a reinforcement 50 shown in FIG. 8, and is provided inside an outer frame (not shown) having a cross-sectional shape where one surface forms an open face. The reinforcement 50 includes a plurality of protruding portions 51, which protrudes toward the outer frame, on the surface thereof facing the open face of the outer frame. The protruding portions 51 are disposed at substantially regular intervals in the longitudinal direction of the reinforcement 50 so as to be separated from each other.

Further, the protruding portions 51 of the reinforcement 50 are welded to the outer frame. Since the protruding portions 51 are welded to the outer frame, it is possible to firmly weld the reinforcement 50 to the outer frame without forming the reinforcement 50 with a very high accuracy. Accordingly, the shape of the reinforcement 50 does not require very high accuracy, and this can contribute to the improvement of productivity.

CITATION LIST

Patent Literature

[Patent Literature 1] Japanese Unexamined Patent Application Publication No. 2002-53068

SUMMARY OF INVENTION

Technical Problem

However, in the framework structure in the related art shown in FIG. 8, the plurality of protruding portions 51 of the reinforcement 50 is disposed at substantially regular intervals in the longitudinal direction of the reinforcement 50 so as to be separated from each other. Accordingly, the distribution of strength, which is provided to the outer frame (outer member) by the reinforcement 50, becomes uniform. For this reason, since the outer frame is reinforced without consideration of the magnitude of stress applied to the outer frame, there has been a problem in that it cannot be said that the reinforcing ability of the reinforcement is sufficiently obtained.

Accordingly, an object of the invention is to provide a framework structure of a vehicle where high productivity can be obtained, a reinforcement and an outer frame can be completely welded to each other, and the reinforcing ability of the reinforcing member can be sufficiently obtained when the reinforcing member is provided on the outer member.

Solution to Problem

A framework structure of a vehicle according to the invention, which achieves the above-mentioned object, includes a center pillar that extends in a vertical direction and includes an outer member and a long reinforcing member. The outer member is long and has a cross-sectional shape where a part of a substantially polygonal shape forms an open face. The reinforcing member is mounted on the inside of the outer member and reinforces the outer member. A plurality of protruding portions, which protrude toward the outer member, is formed on the surface of the reinforcing member facing the open face. Non-protruding forming portions are formed at the positions, which correspond to a belt line, on the center pillar.

In the framework structure of a vehicle according to the invention, the plurality of protruding portions, which protrude toward the outer member, is formed on the outer surface of the center pillar and the non-protrusion forming portions are formed at the belt line positions on the center pillar. For this reason, edge lines do not have an uneven shape at the belt line positions where a bending moment input is increased, and strength can be increased at these belt line positions. Accordingly, the reinforcing ability of the reinforcing member can be sufficiently obtained when the reinforcing member is provided on the outer member of the center pillar. Here, the "belt line" of the invention means a boundary between a window and a door main body of a door of a vehicle.

Further, a framework structure of a vehicle according to the invention, which achieves the above-mentioned object, includes a center pillar that extends in a vertical direction and includes an outer member and a long reinforcing member. The outer member is long and has a cross-sectional shape where a part of a substantially polygonal shape forms an open face. The reinforcing member is mounted on the inside of the outer member and reinforces the outer member. A plurality of protruding portions, which protrude toward the outer member, is formed on the surface of the reinforcing member facing the open face. The protruding portions are formed over the entire region of the positions, which correspond to a belt line, on the center pillar.

In the framework structure of a vehicle according to the invention, the protrusion forming portions are formed over the entire region of the belt line positions on the outer surface of the center pillar. In this way, even in the aspect where the protrusion forming portions are formed over the entire region as described above, edge lines do not have an uneven shape at the belt line positions where a bending moment input is increased and strength can be increased at the belt line positions. Accordingly, the reinforcing ability of the reinforcing member can be sufficiently obtained when the reinforcing member is provided on the outer member of the center pillar.

Further, a framework structure of a vehicle according to the invention, which achieves the above-mentioned object, includes a framework member that includes an outer member and a long reinforcing member. The outer member is long and has a cross-sectional shape where a part of a substantially polygonal shape forms an open face. The reinforcing member is mounted on the inside of the outer member and reinforces the outer member. Three or more protruding portions, which protrude toward the outer member, are formed on the surface of the reinforcing member facing the open face. The plurality of protruding portions is disposed at different intervals so as to correspond to the positions in the longitudinal direction of the reinforcing member.

In the framework structure of a vehicle according to the invention, three or more protruding portions, which protrude toward the outer member, are formed on the surface of the reinforcing member facing the open face. For this reason, since the shape of the reinforcing member does not need to accurately correspond to the outer member, it is possible to obtain high productivity. Further, edge lines have an uneven shape at the positions where the protruding portions are formed, on the surface (hereinafter, referred to as an "outer surface") of the reinforcing member facing the open face. If the edge lines have an uneven shape, the reinforcing member receives a lateral load from the side of the vehicle. If the outer surface of the reinforcing member receives a compressive load, stress concentration occurs at the portions where the edge lines have an uneven shape. As a result, the buckling of the reinforcing member is apt to occur. In this regard, in the framework structure of a vehicle according to this embodiment, three or more protruding portions are disposed at different intervals so as to correspond to the positions in the longitudinal direction of the reinforcing member. For this reason, the protruding portions are not formed at the positions where a compressive load is increased, and the protruding portions may be formed at the positions where a compressive load is decreased. Since the protruding portions are formed as described above, it may be possible to effectively prevent the buckling of the reinforcing member caused by a compressive load and the reinforcing ability of the reinforcing member can be sufficiently obtained when the reinforcing member is provided on the outer member.

Furthermore, a framework structure of a vehicle according to the invention, which achieves the above-mentioned object, includes a framework member that includes an outer member and a long reinforcing member. The outer member is long and has a cross-sectional shape where a part of a substantially polygonal shape forms an open face. The reinforcing member is mounted on the inside of the outer member and reinforces the outer member. A plurality of protruding portions, which protrude toward the outer member, is formed on the surface of the reinforcing member facing the open face. Non-protrusion forming portions are formed at a maximum bending moment input position on the framework member.

In the framework structure of a vehicle according to the invention, the plurality of protruding portions, which protrude toward the outer member, is formed on the outer surface of the reinforcing member and the non-protrusion forming portions are formed at the maximum bending moment input position on the framework member. For this reason, edge lines do not have an uneven shape at the positions where a bending moment input is increased, and strength can be increased at these positions. Accordingly, the reinforcing ability of the reinforcing member can be sufficiently obtained when the reinforcing member is provided on the outer member.

In addition, a framework structure of a vehicle according to the invention, which achieves the above-mentioned object, includes a framework member that includes an outer member and a long reinforcing member. The outer member is long and has a cross-sectional shape where a part of a substantially polygonal shape forms an open face. The reinforcing member is mounted on the inside of the outer member and reinforces the outer member. A plurality of protruding portions, which protrudes toward the outer member, is formed on the surface of the reinforcing member facing the open face. The protruding portions are formed over the entire region of a maximum bending moment input position on the framework member.

In the framework structure of a vehicle according to the invention, the protrusion forming portions are formed over the entire region of the maximum bending moment input position on the outer surface of the reinforcing member. Even in the aspect where the protrusion forming portions are formed over the entire region as described above, edge lines do not have an uneven shape at the positions where a bending moment input is increased and strength can be increased at these positions. Accordingly, the reinforcing ability of the reinforcing member can be sufficiently obtained when the reinforcing member is provided on the outer member.

Moreover, a framework structure of a vehicle according to the invention, which achieves the above-mentioned object, includes a framework member that includes an outer member and a long reinforcing member. The outer member is long and has a cross-sectional shape where a part of a substantially polygonal shape forms an open face, and the reinforcing member is mounted on the inside of the outer member and reinforces the outer member. The reinforcing member and the outer member are fixed to each other by welding at the surface of the reinforcing member facing the open face. Welding positions between the reinforcing member and the outer member are disposed at different intervals so as to correspond to the positions in the longitudinal direction of the reinforcing member.

In the framework structure of a vehicle according to the invention, the welding positions between the outer surface of the reinforcing member and the outer member are disposed at different intervals so as to correspond to the positions in the longitudinal direction of the reinforcing member. For this reason, the reinforcing member is not welded to the outer member at the position where a compressive load is increased and the reinforcing member may be welded to the outer member at the position where a compressive load is decreased. Since the welded portions are disposed as described above, it may be possible to effectively prevent the buckling of the reinforcing member caused by a compressive load and the reinforcing ability of the reinforcing member can be sufficiently obtained when the reinforcing member is provided on the outer member.

Here, the reinforcing member and the outer member may be welded to each other on a different surface from the surface where the welding positions are formed, at a position where a distance between the welding positions is longer than a distance between the other welding positions.

Since the outer member and the outer surface of the reinforcing member are not welded to each other at the position where a distance between the welding positions is longer than a distance between the other welding positions as described above, it is considered that the number of welding positions between the reinforcing member and the outer member is reduced. Accordingly, in the aspect where the reinforcing member and the outer member are welded to each other on the surface different from the surface where the welding positions are formed at the position where a distance between the welding positions is longer than a distance between the other welding positions, it is possible to reliably weld the reinforcing member to the outer member.

Moreover, a framework structure of a vehicle according to the invention, which achieves the above-mentioned object, includes a framework member that includes an outer member and a long reinforcing member. The outer member is long and has a cross-sectional shape where a part of a substantially polygonal shape forms an open face. The reinforcing member is mounted on the inside of the outer member and reinforces the outer member. A plurality of protruding portions, which protrude toward the outer member, is formed on the surface of the reinforcing member facing the open face. The plurality of protrusions is formed so that edge lines have continuity at a part of a portion between the plurality of protruding portions.

In the framework structure of a vehicle according to the invention, the plurality of protruding portions, which protrude toward the outer member, is formed on the outer surface of the reinforcing member and the plurality of protrusions is formed so that edge lines have continuity at a part of a portion between the plurality of protruding portions. For this reason, it is possible to reduce the number of uneven portions of the edge lines of the outer surface of the reinforcing member. Accordingly, it may be possible to effectively prevent the buckling of the reinforcing member caused by a compressive load and the reinforcing ability of the reinforcing member can be sufficiently obtained when the reinforcing member is provided on the outer member.

Advantageous Effects of Invention

According to the framework structure of a vehicle of the invention, it may be possible to obtain high productivity, to completely weld a reinforcement to an outer frame, and to sufficiently obtain the reinforcing ability of a reinforcing member when the reinforcing member is provided on an outer member.

DESCRIPTION OF REFERENCE SIGNS

Figure 1:
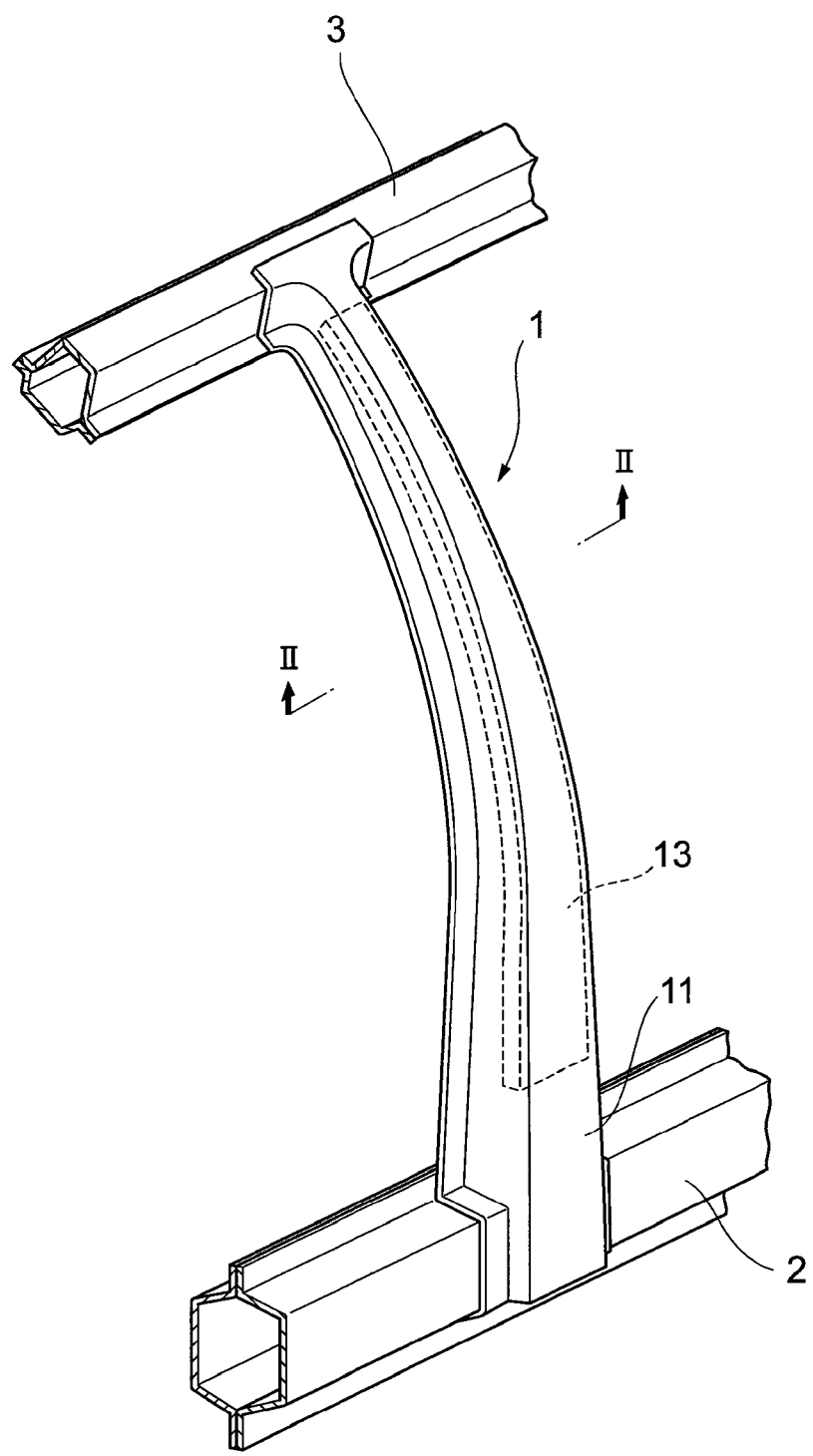
FIG. 1 is a perspective view of a center pillar of a vehicle according to a first embodiment.

1 . . . center pillar; 2 . . . locker; 3 . . . upper member; 11 . . . outer frame; 12 . . . inner frame; 13, 40, 50 . . . reinforcement; 14, 41, 51 . . . protruding portion; 15 . . . concave groove; 16, 32, 42 . . . side wall portion; 21, 22 . . . flange; N . . . non-protruding portion; PC1 . . . middle first protruding portion; PC2 . . . middle second protruding portion; PL1 . . . left first protruding portion; PR1 . . . right first protruding portion; PL2 . . . left second protruding portion; PR2 . . . right second protruding portion; PL3 . . . left third protruding portion; PR3 . . . right third protruding portion; PL4 . . . left fourth protruding portion; PR4 . . . right fourth protruding portion; PL5 . . . left fifth protruding portion; PR5 . . . right fifth protruding portion; PL6 . . . left sixth protruding portion; PR6 . . . right sixth protruding portion;

DESCRIPTION OF EMBODIMENTS

Embodiments of the invention will be described in detail below with reference to the accompanying drawings. Meanwhile, the same elements in the description of the drawings are denoted by the same reference numerals, and the repeated description will be omitted. Further, for convenience of illustration, the ratio of the dimensions in the drawings does not necessarily correspond to the object to be described.

Figure 2:
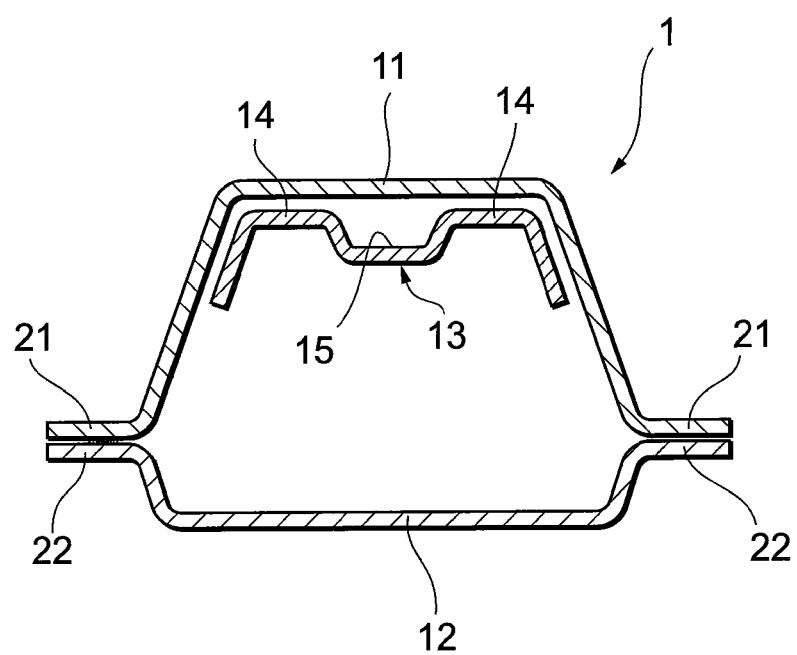
FIG. 2 is a cross-sectional view taken along a line II-II of FIG. 1.
Figure 3:
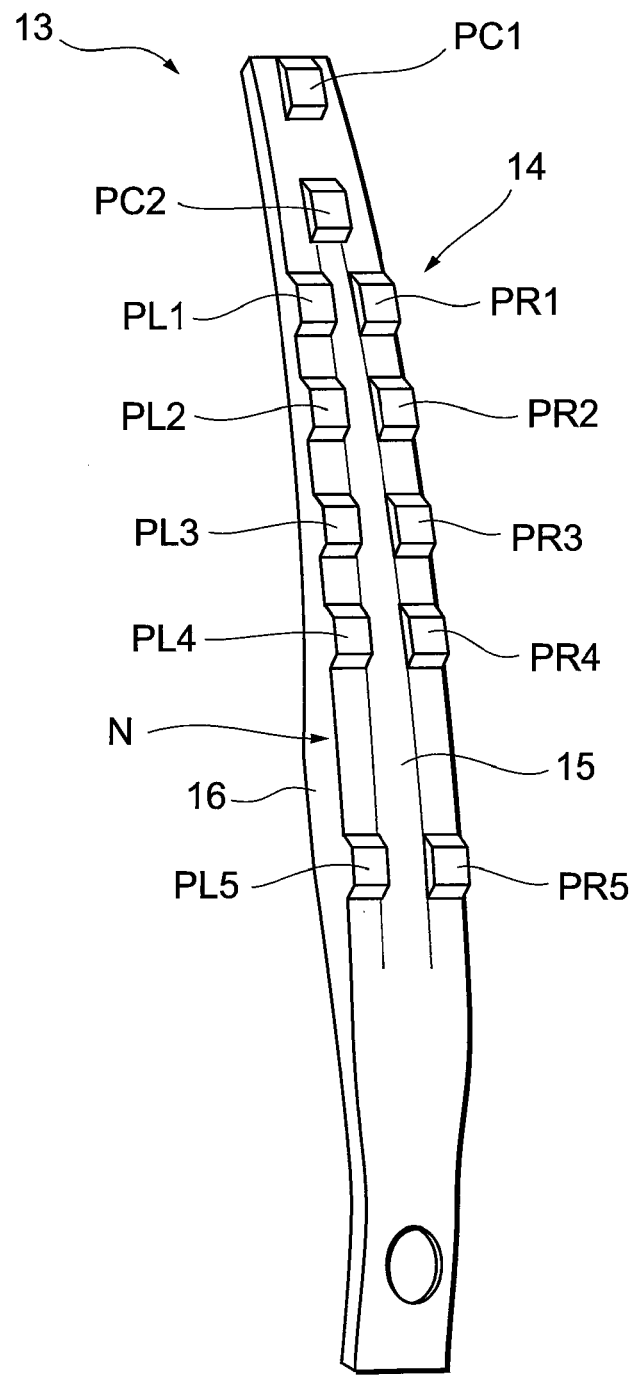
FIG. 3 is a perspective view of a reinforcement.
Figure 4:
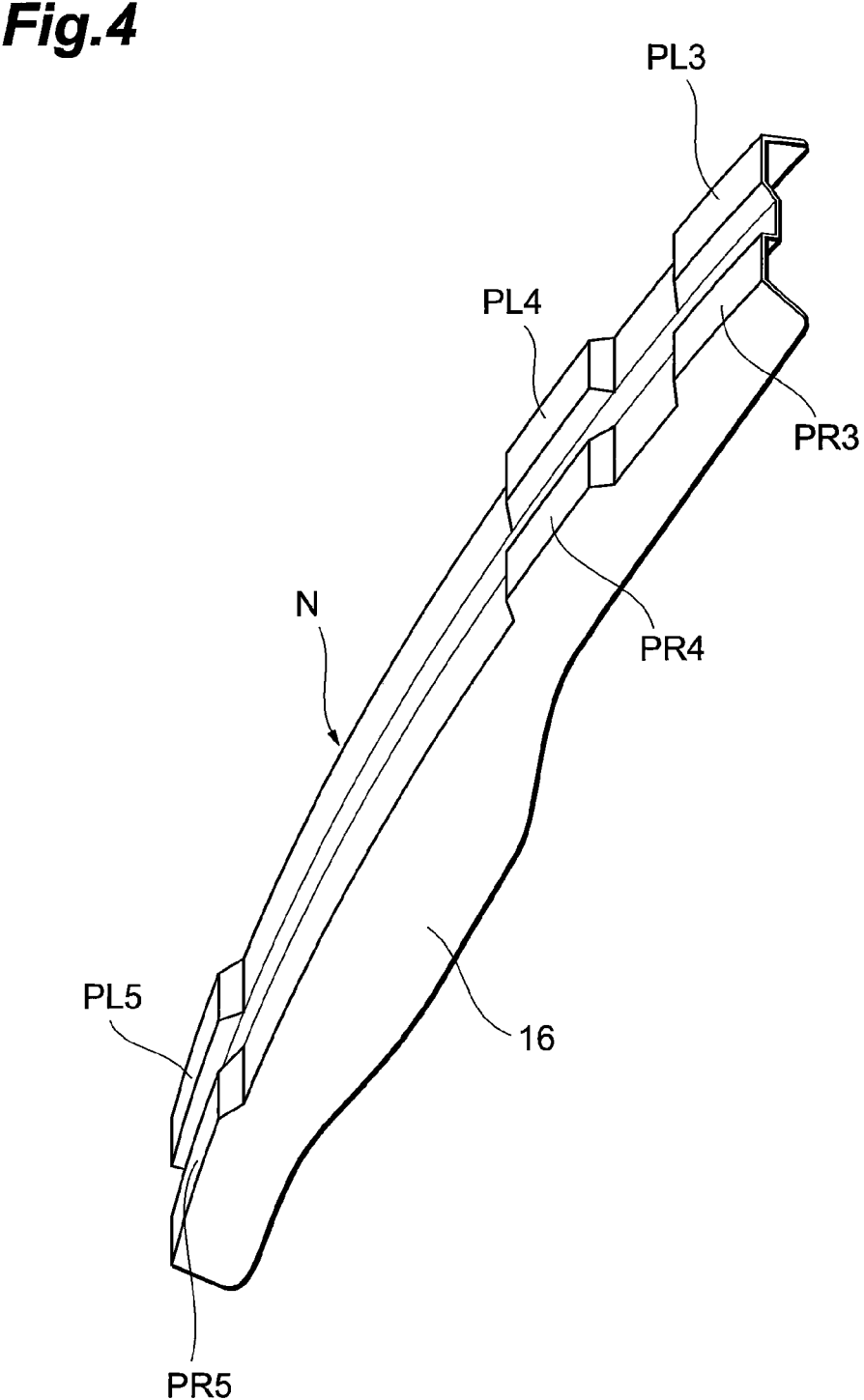
FIG. 4 is an enlarged perspective view of main portions of the reinforcement.

FIG. 1 is a perspective view of a center pillar of a vehicle according to a first embodiment, FIG. 2 is a cross-sectional view taken along a line II-II of FIG. 1, FIG. 3 is a perspective view of a reinforcement, and FIG. 4 is an enlarged perspective view of main portions of the reinforcement. As shown in FIGS. 1 and 2, a center pillar 1, which forms a framework structure of a vehicle according to this embodiment, is provided so as to be stretched between a locker 2 that is provided at a lower side portion of a vehicle and an upper member 3 that is provided at an upper side portion of the vehicle. Further, the center pillar 1 has a shape where the width is increased from the upper portion toward the lower portion.

As shown in FIG. 2, the center pillar 1 includes an outer frame 11 that is an outer member, an inner frame 12, and a reinforcement 13 that forms a reinforcing member. Each of the outer and inner frames 11 and 12 is long and has a cross-sectional shape where a part of a substantially quadrangular shape forms an open face. Further, flanges 21 and 22 are formed at both sides of the open faces, respectively. The flanges 21 and 22 face each other and are welded to each other, so that the outer and inner frames 11 and 12 are joined to each other.

Moreover, a reinforcement 13 is provided inside the outer frame 11. The reinforcement 13 is long and has a cross-sectional shape where a part of a substantially quadrangular shape forms an open face. Meanwhile, the cross-sectional shape of the reinforcement 13 is even smaller than that of the outer frame 11.

A plurality of protruding portions 14, which protrudes toward the outer frame 11, is formed on the outer surface that is the surface of the reinforcement 13 facing the open face. Further, as shown in FIGS. 2 and 3, a concave groove 15 where the middle portion of the reinforcement 13 in the width direction of the reinforcement is recessed from end portions of the reinforcement 13 in the width direction is formed in the vicinity of the middle portion of the reinforcement 13 in the height direction of the reinforcement 13.

As shown in FIGS. 3 and 4, the plurality of protruding portions 14 is disposed substantially at the middle portion of the outer surface of the reinforcement 13 in the width direction in the vicinity of the upper end portion of the reinforcement 13. Further, the protruding portions 14 are disposed in pairs at both end portions of the reinforcement 13 in the width direction substantially in the vicinity of the middle portion of the reinforcement 13 in the height direction of the reinforcement 13.

Specifically, as shown in FIG. 3, a middle first protruding portion PC1 of these protruding portions 14 is formed at the upper end portion of the reinforcement 13 and a middle second protruding portion PC2 of these protruding portions 14 is formed at a position below the middle first protruding portion PC1. These first and second protruding portions PC1 and PC2 are formed at the middle portion of the reinforcement 13 in the width direction of the reinforcement, respectively.

Further, left and right first protruding portions PL1 and PR1 are formed at the positions below the middle second protruding portion PC2. These left and right first protruding portions PL1 and PR1 are disposed at substantially the same height position in the height direction of the reinforcement 13, and are disposed at both left and right end portions of the reinforcement 13 in the width direction of the reinforcement 13, respectively.

Furthermore, left and right second protruding portions PL2 and PR2 to left and right fifth protruding portions PL5 and PR5 are formed below the left and right first protruding portions PL1 and PR1, respectively. Each of the separation distances between the left and right second protruding portions PL2 and PR2 and the left and right third protruding portions PL3 and PR3 of these left and right protruding portions PL1 to PL5 and PR1 to PR5 in the height direction of the reinforcement 13 is substantially equal to each of the separation distances between the left and right first protruding portions PL1 and PR1 and the left and right second protruding portions PL2 and PR2 in the height direction of the reinforcement 13.

Likewise, each of the separation distances between the left and right third protruding portions PL3 and PR3 and the left and right fourth protruding portions PL4 and PR4 in the height direction of the reinforcement 13 is substantially equal to each of the separation distances between the left and right second protruding portions PL2 and PR2 and the left and right third protruding portions PL3 and PR3 in the height direction of the reinforcement 13.

Meanwhile, as shown in FIG. 4, each of the separation distances between the left and right fourth protruding portions PL4 and PR4 and the left and right fifth protruding portions PL5 and PR5 in the height direction of the reinforcement 13 is larger than each of the separation distances between the left and right third protruding portions PL3 and PR3 and the left and right fourth protruding portions PL4 and PR4 in the height direction of the reinforcement 13. As described above, portions of the outer surface of the reinforcement 13 between the left and right fourth protruding portions PL4 and PR4 and the left and right fifth protruding portions PL5 and PR5 form non-protruding portions N where protruding portions are not formed.

Further, when the reinforcement 13 is mounted on a vehicle, the positions between the left and right fourth protruding portions PL4 and PR4 and the left and right fifth protruding portions PL5 and PR5 are adjusted so as to have a height corresponding to a belt line of the vehicle. As described above, the non-protruding portions N are formed on the outer surface of the reinforcement 13 so as to correspond to the height of the belt line of the vehicle.

Furthermore, as shown in FIG. 3, a through hole is formed at the lower end portion of the outer surface of the reinforcement 13. Moreover, side wall portions 16 are formed at the left and right portions of the reinforcement 13, respectively. The side wall portions 16 have substantially the same width between the height position on the reinforcement 13 where the middle first protruding portion PC1 is formed and the height position on the reinforcement 13 where the left and right fourth protruding portions PL4 and PR4 are formed.

Here, the width of the side wall portion 16 means the width of the reinforcement 13 along a protruding direction of the protruding portion 14 (a direction perpendicular to the outer surface). Further, the width of the side wall portion 16 between the height position where the left and right fourth protruding portions PL4 and PR4 are formed and the height position where the left and right fifth protruding portions PL5 and PR5 are formed is larger than that at other positions.

Furthermore, the reinforcement 13 is fixed to the outer frame 11 by welding. Here, welding points where the reinforcement 13 is welded to the outer frame 11 are respective arbitrary points on the middle first protruding portion PC1, the middle second protruding portion PC2, and the left and right first protruding portions PL1 and PR1 to the left and right fourth protruding portions PL4 and PR4, and two arbitrary points on the left and right side wall portions 16 between the height position where the left and right fourth protruding portions PL4 and PR4 are formed and the height position where the left and right fifth protruding portions PL5 and PR5 are formed.

Next, the effect of the framework structure of a vehicle according to this embodiment will be described.

In the framework structure of a vehicle according to this embodiment, the protruding portions 14, which protrude toward the outside of the vehicle body, are formed on the outer surface of the reinforcement 13. Since the protruding portions 14 are formed, it is possible to firmly weld the reinforcement 13 to the outer frame 11 without making the shape of the reinforcement 13 accurately correspond to the shape of the inner portion of the outer frame 11. Accordingly, the reinforcement 13 is easily formed, and this can contribute to the improvement of productivity.

Further, in the framework structure of a vehicle according to this embodiment, the non-protruding portions N are formed on the outer surface of the reinforcement 13 in the vicinity of the belt line and the protruding portions are formed at other positions. The edge lines of the outer surface of the reinforcement 13 have an uneven shape at the positions where the protruding portions are formed, and the edge lines have a smooth shape (a shape without uneven portions) at the positions where the non-protruding portions N are formed. Furthermore, the belt line becomes the maximum bending moment input position where a bending moment input is the maximum when the vehicle is subjected to a side collision.

If the edge lines have an uneven shape, the reinforcing member receives a lateral load from the side of the vehicle. If the outer surface of the reinforcing member receives a compressive load, stress concentration occurs at the portions where the edge lines have an uneven shape. As a result, the buckling of the reinforcing member is apt to occur. In this regard, in the framework structure of a vehicle according to this embodiment, the non-protruding portions N are positioned in the vicinity of the belt line that is the maximum bending moment input position on the outer surface of the reinforcement 13. For this reason, since the strength of the reinforcing member can be increased in the vicinity of the belt line where a bending moment input becomes the maximum, it is possible to sufficiently increase the reinforcing strength of the center pillar 1.

Moreover, in the framework structure of a vehicle according to this embodiment, the protruding portions 14 formed at the reinforcement 13 are fixed to the inner surface of the outer frame 11 by welding. Since the protruding portions 14 are formed at the positions other than the vicinity of the belt line, the reinforcement 13 and the outer frame 11 are welded to each other at the positions other than the vicinity of the belt line. Further, the reinforcement 13 and the outer frame 11 are not welded to each other in the vicinity of the belt line.

The strength of the framework structure against a lateral load is large at the portions where the reinforcement 13 and the outer frame 11 are not welded to each other as compared to the portions where the reinforcement 13 and the outer frame 11 are welded to each other. For this reason, since it is possible to increase the strength of the center pillar in the vicinity of the belt line where a bending moment input becomes the maximum, it is possible to more sufficiently increase the reinforcing strength of the center pillar 1.

Further, since the non-protruding portions N are formed on the outer surface of the reinforcement 13, the outer surface of the reinforcement 13 is separated from the outer frame 11. Accordingly, it may not be possible to weld the outer surface of the reinforcement 13 to the outer frame 11. For this reason, there is a concern in regard to the welding strength between the outer frame 11 and the outer surface of the reinforcement 13 in the vicinity of the belt line. However, in this embodiment, the outer frame 11 and the side wall portions of the reinforcement 13 are fixed to each other by welding in the vicinity of the belt line. For this reason, it is possible to reliably weld the reinforcement 13 to the outer frame 11 even in the vicinity of the belt line.

Figure 5:
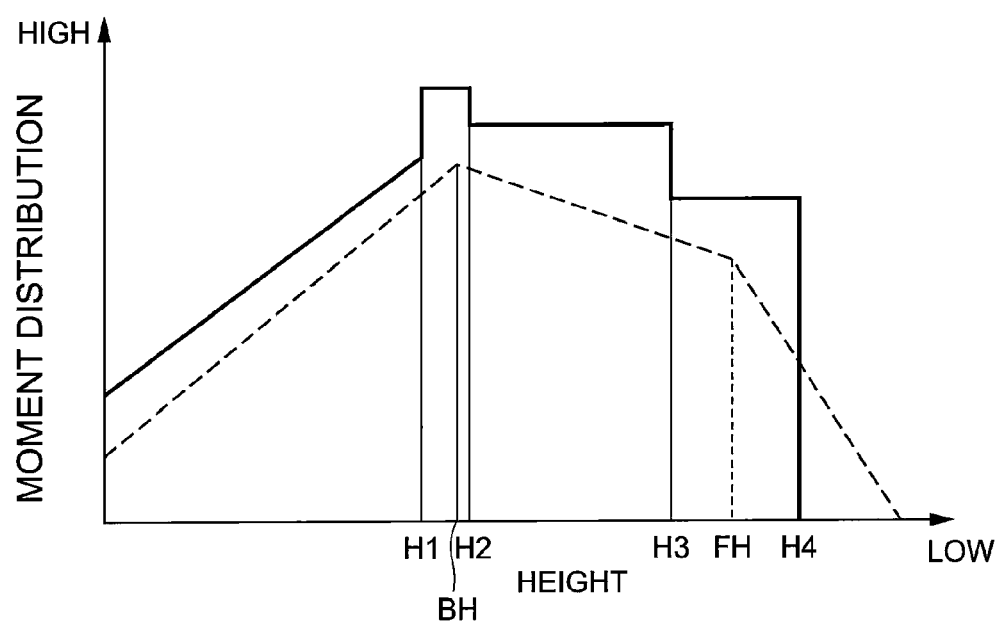
FIG. 5 is a graph showing a relationship between input bending moment and bending strength of the center pillar 1.

Here, a relationship between input bending moment and bending strength of the center pillar 1 according to this embodiment will be described. FIG. 5 is a graph showing a relationship between input bending moment and bending strength of the center pillar 1. As a height position is lowered, input bending moment is increased in the center pillar 1 at a position higher than the height BH of the belt line as shown by a broken line in FIG. 5. The input bending moment has a peak at the height BH of the belt line and is decreased as a height position is lowered. Further, the degree of the decrease of the input bending moment is increased at a position lower than a predetermined lower height FH.

The center pillar 1 where the above-mentioned input bending moment is generated is provided with the reinforcement 13 that makes the center pillar have the bending strength shown by a solid line in FIG. 5. Until the height position reaches a first height position H1 that is a position slightly higher than the height BH of the belt line, the bending strength is increased as the height position is lowered. Moreover, until the height position reaches a second height position H2 that is a position slightly lower than the height BH of the belt line from a position slightly higher than the height BH of the belt line from the first height position H1, bending strength is constant.

Further, bending strength is slightly decreased at the position below the second height position H2. Until the height position reaches a third height position H3, which is a position slightly higher than the predetermined height FH, from the second height position H2, the decreased bending strength is maintained. Furthermore, until a height position reaches a fourth height position H4, which is a position slightly lower than the predetermined height FH, from the third height position H3, bending strength is further decreased and the decreased bending strength is maintained. Bending strength is zero at a position that is lower than the fourth height position H4.

It is possible to sufficiently increase the reinforcing strength of the center pillar 1 by setting bending strength according to the input bending moment as described above and setting the shape of the reinforcement 13 so that the bending strength is higher than the input bending moment at most positions on the center pillar 1.

Figure 6:
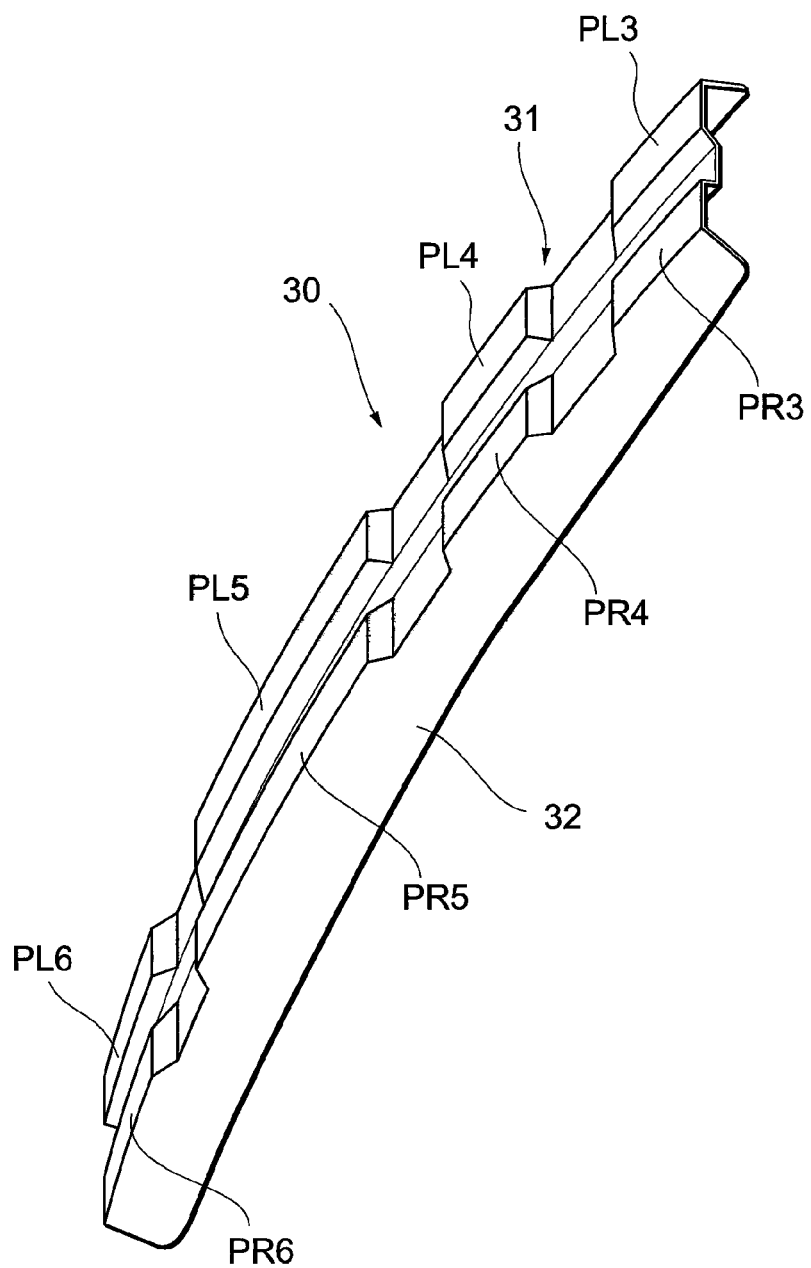
FIG. 6 is a perspective view of a reinforcement according to a second embodiment.

Next, a second embodiment of the invention will be described. A framework structure of a vehicle according to this embodiment is mainly different from the framework structure of a vehicle according to the first embodiment in terms of the aspect of a reinforcement of a center pillar, and is the same as the first embodiment in terms of other aspects. FIG. 6 is an enlarged perspective view of main portions of a reinforcement of a center pillar according to a second embodiment.

As shown in FIG. 6, a reinforcement 30 of a center pillar of the framework structure of a vehicle according to this embodiment is long and has a cross-sectional shape where a part of a substantially quadrangular shape forms an open face, as in the first embodiment. A plurality of protruding portions 31, which protrudes toward an outer frame, is formed on the outer surface that is the surface of the reinforcement 30 facing the open face.

As in the first embodiment, the middle first protruding portion PC1, the middle second protruding portion PC2, the left and right first protruding portions PL1 and PR1, and the left and right second protruding portions PL2 and PR2, which are shown in FIG. 1, are formed as the plurality of protruding portions 31. In addition, left and right third protruding portions PL3 and PR3 to left and right sixth protruding portions PL6 and PR6 shown in FIG. 6 are formed.

The widths of the middle first protruding portion PC1, the middle second protruding portion PC2, the left and right first protruding portions PL1 and PR1 to the left and right fourth protruding portions PL4 and PR4, and the left and right sixth protruding portions PL6 and PR6 of these protruding portions along the longitudinal direction of the reinforcement 30 are substantially equal to each other. Further, each of the widths of the left and right fifth protruding portions PL5 and PR5 along the longitudinal direction of the reinforcement 30 is larger than each of the widths of them along the longitudinal direction of the reinforcement 30. Furthermore, the left and right fifth protruding portions PL5 and PR5 are disposed at the positions corresponding to the belt line.

On the other hand, in the framework structure of a vehicle according to this embodiment, side wall portions 32 are formed at the left and right portions of the reinforcement 30, respectively. This embodiment is different from the first embodiment in that the side wall portions 32 have the same width at any position in the longitudinal direction of the reinforcement 30. In addition, the left and right fifth protruding portions PL5 and PR5 are not welded to the outer frame, and the left and right fifth protruding portions PL5 and PR5 form unwelded portions.

Next, the effect of the framework structure of a vehicle according to this embodiment will be described.

As in the first embodiment, the protruding portions 31, which protrude toward the outside of the vehicle body, are formed on the outer surface of the reinforcement 30 in the framework structure of a vehicle according to this embodiment. For this reason, it is possible to easily form the reinforcement 30. Accordingly, this can contribute to the improvement of productivity.

Further, in the framework structure of a vehicle according to this embodiment, the left and right fifth protruding portions PL5 and PR5 are formed on the outer surface of the reinforcement 30 in the vicinity of the belt line. The left and right fifth protruding portions PL5 and PR5 have a large width along the longitudinal direction of the reinforcement 30 and protrude over the entire region in the vicinity of the belt line, and the edge lines of the left and right fifth protruding portions have a smooth shape (a shape without uneven portions). Meanwhile, the edge lines of the outer surface of the reinforcement 30 have an uneven shape at the positions where the other protruding portions PC1, PC2, PL1 to PL4, PL6, PR1 to PR4, and PR6 are formed. For this reason, since the edge lines may not have an uneven shape in the vicinity of the belt line where a bending moment input becomes maximum, strength is increased. Accordingly, it is possible to sufficiently increase the reinforcing strength of the center pillar 1.

Figure 7:
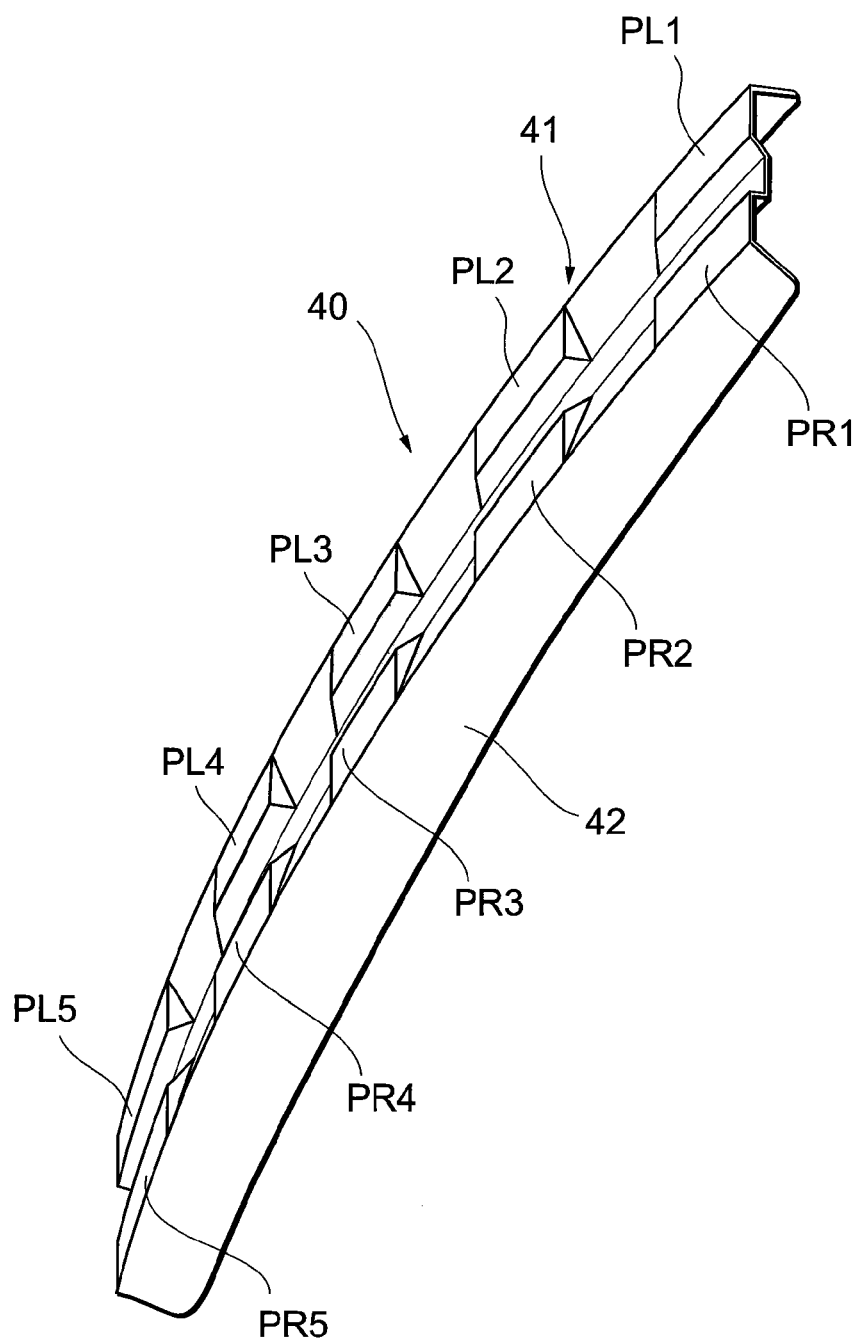
FIG. 7 is a perspective view of a reinforcement according to a third embodiment.
Figure 8:
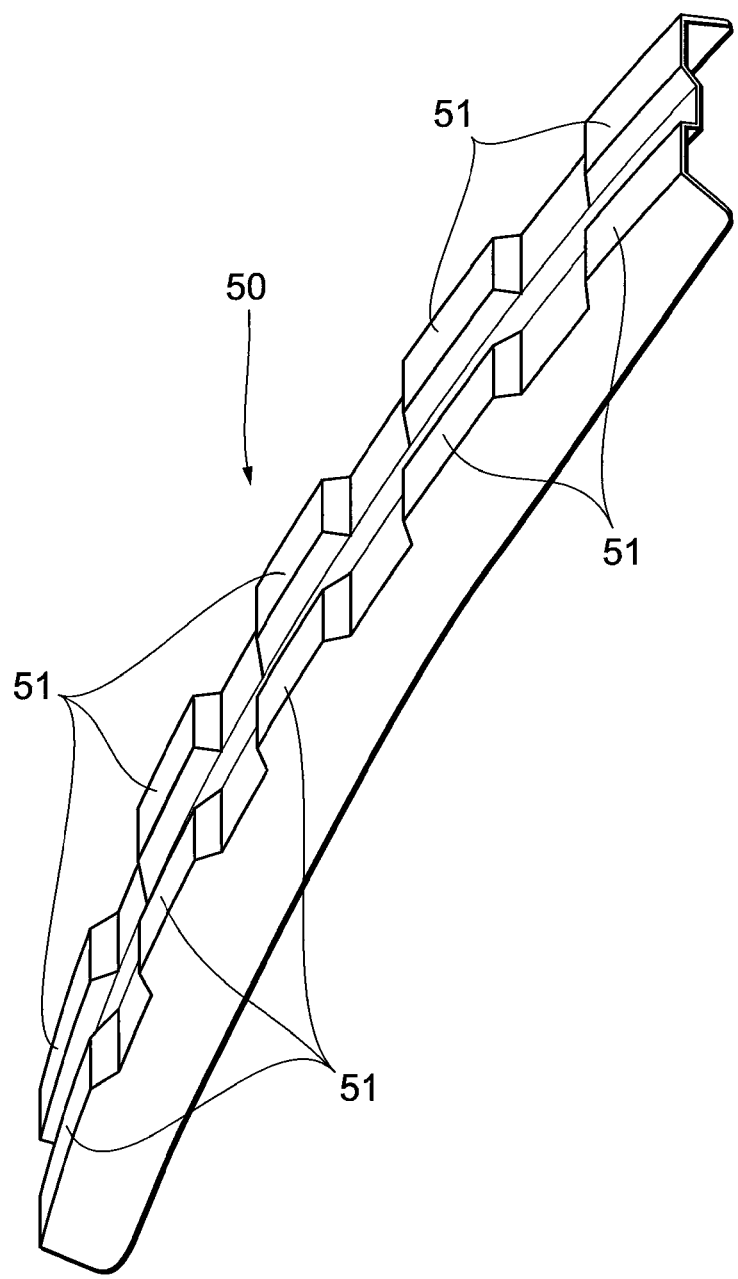
FIG. 8 is a perspective view of a reinforcement in the related art.

Next, a third embodiment of the invention will be described. A framework structure of a vehicle according to this embodiment is mainly different from the framework structure of a vehicle according to the first embodiment in terms of the aspect of a reinforcement of a center pillar, and is the same as the first embodiment in terms of other aspects. FIG. 7 is an enlarged perspective view of main portions of a reinforcement of a center pillar according to a third embodiment.

As shown in FIG. 7, a reinforcement 40 of a center pillar of the framework structure of a vehicle according to this embodiment is long and has a cross-sectional shape where a part of a substantially quadrangular shape forms an open face, as in the first embodiment. A plurality of protruding portions 41, which protrudes toward an outer frame, is formed on the outer surface that is the surface of the reinforcement 40 facing the open face.

As in the first embodiment, the middle first protruding portion PC1 and the middle second protruding portion PC2, which are shown in FIG. 1, are formed as the plurality of protruding portions 41. In addition, left and right first protruding portions PL1 and PR1 to left and right fifth protruding portions PL5 and PR5 shown in FIG. 7 are formed.

The widths of the left and right protruding portions, which are adjacent to each other in the longitudinal direction of the reinforcement 40, of these left and right first protruding portions PL1 and PR1 to left and right fifth protruding portions PL5 and PR5 are substantially equal to each other. Further, the height of the outer portion of the portion of the reinforcement 40, which is formed between the left first protruding portion PL1 and the left second protruding portion PL2, in the width direction of the reinforcement 40 is substantially equal to the heights of the left first protruding portion PL1 and the left second protruding portion PL2. The portion of the reinforcement 40, which is formed between the left first protruding portion and the left second protruding portion, is inclined so as to be gradually lowered toward the inside in the width direction of the reinforcement 40.

Moreover, each of the portions between the left second protruding portion PL2 to the left fifth protruding portion PL5 and each of the portions between the right first protruding portion PR1 to the right fifth protruding portion PR5 have the same shape as the shape of the portion between the left first protruding portion PL1 and the left second protruding portion PL2. In this way, the outer edge lines of the reinforcement 40 in the width direction have the shape of a smooth curve and do not have an uneven shape. On the other hand, a belt line corresponds to the positions where the left and right fourth protruding portions PL4 and PR4 are formed.

Further, in the framework structure of a vehicle according to this embodiment, side wall portions 42 are formed at the left and right portions of the reinforcement 40, respectively. This embodiment is the same as the second embodiment in that the side wall portions 42 have the same width at any position in the longitudinal direction of the reinforcement 40. In addition, the left and right fifth protruding portions PL5 and PR5 are not welded to the outer frame, and the left and right fifth protruding portions PL5 and PR5 form unwelded portions.

Next, the effect of the framework structure of a vehicle according to this embodiment will be described.

As in the first embodiment, the protruding portions 41, which protrude toward the outside of the vehicle body, are formed on the outer surface of the reinforcement 40 in the framework structure of a vehicle according to this embodiment. For this reason, it is possible to easily form the reinforcement 40. Accordingly, this can contribute to the improvement of productivity.

Further, in the framework structure of a vehicle according to this embodiment, the left and right first protruding portions PL1 and PR1 to the left and right fifth protruding portions PL5 and PR5 are formed at the position, which includes the vicinity of the belt line, on the reinforcement 40. At the left and right first protruding portions PL1 and PR1 to the left and right fifth protruding portions PL5 and PR5, the outer edge lines of the reinforcement 40 in the width direction have the shape of a smooth curve and do not have an uneven shape. For this reason, since the edge lines may not have an uneven shape in the vicinity of the belt line where a bending moment input becomes maximum, strength is increased. Accordingly, it is possible to sufficiently increase the reinforcing strength of the center pillar 1.

The preferred embodiments of the invention have been described above, but the invention is not limited to the above-mentioned respective embodiments. For example, a center pillar has been described as the framework structure of a vehicle in the above-mentioned embodiments. However, as long as a reinforcing member is provided on an outer member, the invention may be used for other framework structures. Further, various numbers of protruding portions have been formed in the respective embodiments, but the number of protruding portions is not limited thereto and may be appropriately determined.

Furthermore, in the above-mentioned embodiments, there has been exemplified the center pillar where a position corresponding to the maximum input bending moment is a belt line. However, the width between the protruding portions and the like may be appropriately adjusted according to the magnitude of input bending moment. Moreover, not only the width between the protruding portions but also the width of the protruding portion itself may be adjusted.

INDUSTRIAL APPLICABILITY

The invention may be used for a framework structure of a vehicle, particularly, a framework structure of a vehicle where a reinforcing member is provided inside a framework member of a vehicle.

The invention claimed is:

1. A framework structure of a vehicle including a center pillar that extends in a vertical direction and includes an outer member and a long reinforcing member, the outer member being long and having a cross-sectional shape where a part of a substantially polygonal shape forms an open face, and the reinforcing member being mounted on the inside of the outer member and reinforcing the outer member, wherein a plurality of protruding portions, which protrude toward the outer member, is disposed along the longitudinal direction of the reinforcing member on the surface of the reinforcing member facing the open face, and a separation distance between the protruding portions adjacent to each other in the longitudinal direction separated by a position which corresponds to a belt line on the center pillar is longer than the separation distances between the protruding portions adjacent to each other in the longitudinal direction not separated by the position which corresponds to the belt line.

2. A framework structure of a vehicle including a center pillar that extends in a vertical direction and includes an outer member and a long reinforcing member, the outer member being long and having a cross-sectional shape where a part of a substantially polygonal shape forms an open face, and the reinforcing member being mounted on the inside of the outer member and reinforcing the outer member, wherein a plurality of protruding portions, which protrude toward the outer member, is disposed along the longitudinal direction of the reinforcing member on the surface of the reinforcing member facing the open face, and widths of the protruding portions in the longitudinal direction disposed in a position, which corresponds to a belt line on the center pillar are larger than the widths of the protruding portions in the longitudinal direction disposed in positions other than the position which corresponds to the belt line.

\* \* \* \* \*